(12) United States Patent
Chen

(10) Patent No.: US 10,792,600 B2
(45) Date of Patent: Oct. 6, 2020

(54) AIR FILTER DEVICE

(71) Applicant: Dongguan Hesheng Machinery & Electric Co., Ltd., Dongguan (CN)

(72) Inventor: Chi-Wen Chen, New Taipei (TW)

(73) Assignee: DONGGUAN HESHENG MACHINERY & ELECTRIC CO., LTD., Dongguan (CN)

( * ) Notice: Subject to any disclaimer, the term of this patent is extended or adjusted under 35 U.S.C. 154(b) by 358 days.

(21) Appl. No.: 16/015,207

(22) Filed: Jun. 22, 2018

(65) Prior Publication Data

US 2019/0388821 A1    Dec. 26, 2019

(51) Int. Cl.
*B01D 46/00* (2006.01)
*B01D 46/10* (2006.01)
*B01D 46/42* (2006.01)

(52) U.S. Cl.
CPC ......... *B01D 46/0005* (2013.01); *B01D 46/10* (2013.01); *B01D 46/4236* (2013.01); *B01D 2265/029* (2013.01); *B01D 2271/022* (2013.01); *B01D 2275/202* (2013.01); *B01D 2279/00* (2013.01)

(58) Field of Classification Search
CPC ................ B01D 46/0005; B01D 46/10; B01D 46/4236; B01D 2279/00; B01D 2265/029; B01D 2271/022; B01D 2275/202; B01D 46/0047; F02M 35/024
See application file for complete search history.

(56) References Cited

U.S. PATENT DOCUMENTS

| | | | | |
|---|---|---|---|---|
| 5,683,478 | A * | 11/1997 | Anonychuk | B01D 46/0005 454/158 |
| 2004/0031248 | A1* | 2/2004 | Lindsay | B60H 3/06 55/385.3 |
| 2017/0115028 | A1* | 4/2017 | Lee | F24F 13/084 |
| 2018/0080419 | A1* | 3/2018 | Bringhurst | F02M 35/0216 |
| 2018/0340498 | A1* | 11/2018 | Nakao | G10K 11/161 |

* cited by examiner

*Primary Examiner* — Robert Clemente
*Assistant Examiner* — Abhinav Garg
(74) *Attorney, Agent, or Firm* — Leong C. Lei

(57) ABSTRACT

The air filter device includes a main member, a conduit member, a sealing piece, a pressurizing piece, a filter element, and a cap. The conduit member, sealing piece, pressurizing piece, and filter element are sequentially stacked in the main member. The conduit member provides a spiral duct with a second inlet and a second outlet. The second inlet is conducted to an outlet opening of the pressurizing piece. The second outlet is conducted to a plug extended from a bottom side of the main member. The cap is fastened to the main member with airflow paths between the cap and main member. The main member may be joined to the inlet terminal of any air compressor. External air is drawn into the air compressor through the filter element, pressuring element, conduit member, and the plug so as to achieve smooth, steady, and quiet air intake.

4 Claims, 7 Drawing Sheets

AIR FILTER DEVICE

BACKGROUND OF THE INVENTION

(a) Technical Field of the Invention

The present invention is generally related to air filtration, and more particular to an air filter device for a compressor.

(b) Description of the Prior Art

Air compressors or aerators are commonly applied as pneumatic or power sources to drive pneumatic tools, to inflate tires, etc. They have become an indispensable piece of equipment in households and other areas.

An air compressor relies on an electrical motor to rotate a crankshaft, which in turn drives a piston into a reciprocal motion through a connection rod, thereby creating volume change inside a cylinder and producing pressurized air.

An air compressor usually requires air filtration to prevent dusts and sands from being sucked into the compressor and damaging the air compressor, especially when it is applied to inflate tires of, for example, an all-terrain vehicle. Therefore, a simple air filter is usually installed in the air inlet of the air compressor.

The air filter is often fixedly installed in the air compressor and cannot be removed or replaced. The air filter therefore cannot be applied to another air compressor either. In addition, the air inside a conventional air filter is usually designed to flow in a linear manner and, as such, turbulent may be easily formed inside the air filter, causing greater noises and clogging air intake.

SUMMARY OF THE INVENTION

Therefore, an objective of the present invention is to provide an air filter device detachably mounted to any air compressor's inlet that provides smooth, steady, and quiet air intake.

The air filter device includes a main member, a conduit member, a sealing piece, a pressurizing piece, at least a filter element, and a cap. The main member includes a hollow space inside with a top opening, a first duct inside the space with a spiral shape, a first inlet, a first outlet, and a plug extended from a bottom side. The plug has a vertical through channel inside connecting the first outlet. The conduit member is made of a flexible material, and includes a second duct conforming to the shape of the first duct with a second inlet and a second outlet. The conduit member is placed inside the space, the second duct is embedded in the first duct, the first and second inlets are overlapped in a same position, and the first and second outlets are overlapped in another same position. The sealing piece is made of a flexible material, and is placed in the space on top of the conduit member. The pressurizing piece is placed in the space on top of the sealing piece, and includes a number of inlet holes on a top side and an outlet opening along the circumference. The inlet holes and the outlet opening are connected, and the outlet opening is connected to the first and second inlets. The filter element is placed in the space on top of the pressurizing piece covering the inlet holes. The cap covers the top opening of the space with a greater diameter than that of the main member. The cap includes at least a pair of oppositely positioned protruding fastening elements configured around an inner wall and airflow paths formed between neighboring fastening elements. When the cap is detachably fastened to the main member, the airflow paths are connected to the top opening of the main member.

The present invention is characterized in the following. The plug of the main member may be plugged into the inlet terminal of any air compressor. When the air compressor is started, external air is drawn into the space of the main member through the airflow paths of the cap. Impurities such as dusts and particles in the air are then filtered by the filter element. The filtered air then flows through the inlet holes and out of the outlet opening of the pressurizing piece. Subsequently, the air is guided to the first and second inlets, and then to the first and second outlets by the conduit member in a spiral manner. Finally, the filtered air flows into the air compressor through the through channel of the plug. As such, the air filter device is applicable to any air compressor, achieves smooth, steady, and quiet air intake by the conduit member, and effectively filters air flowing into the air compressor by the filter element.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
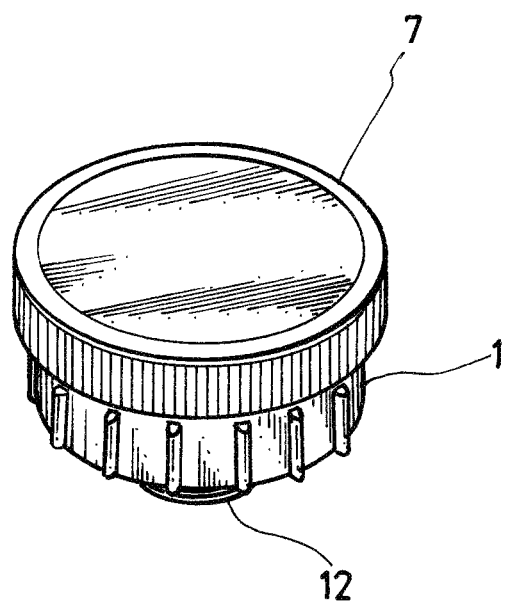
FIG. 1 is a perspective diagram showing an air filter device according to an embodiment of the present invention.
Figure 2:
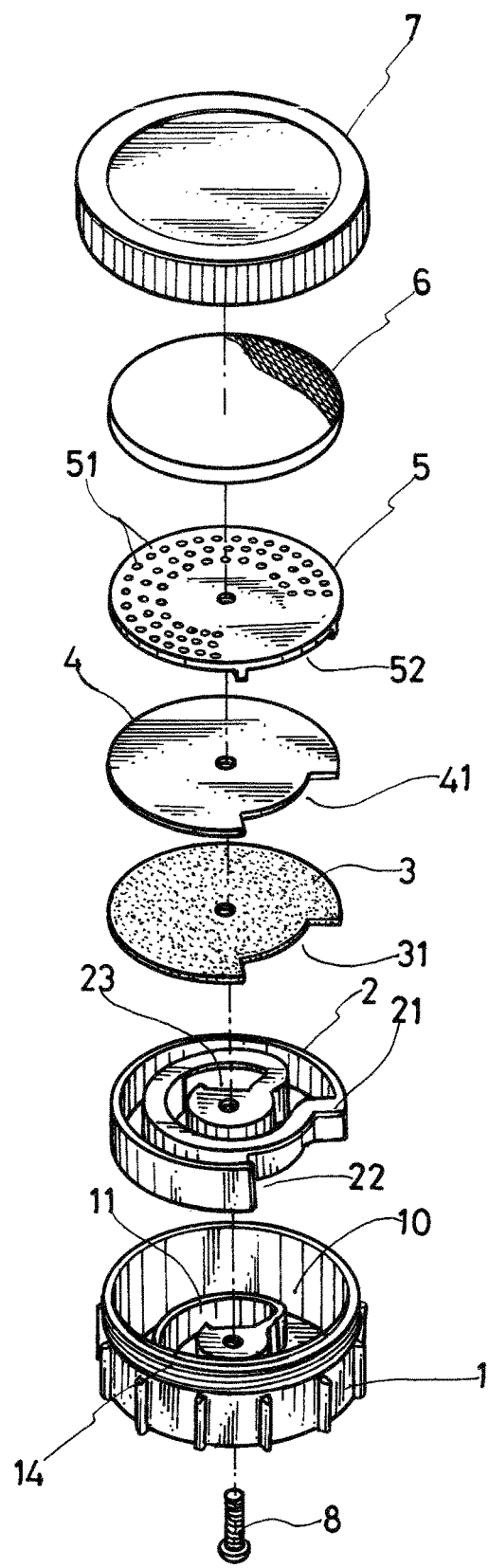
FIG. 2 is a perspective breakdown diagram showing the air filter device of FIG. 1.
Figure 3:
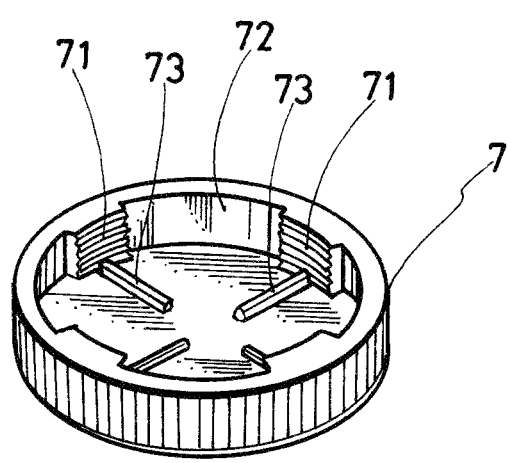
FIG. 3 is a perspective diagram showing a cap of the air filter device of FIG. 1.
Figure 4:
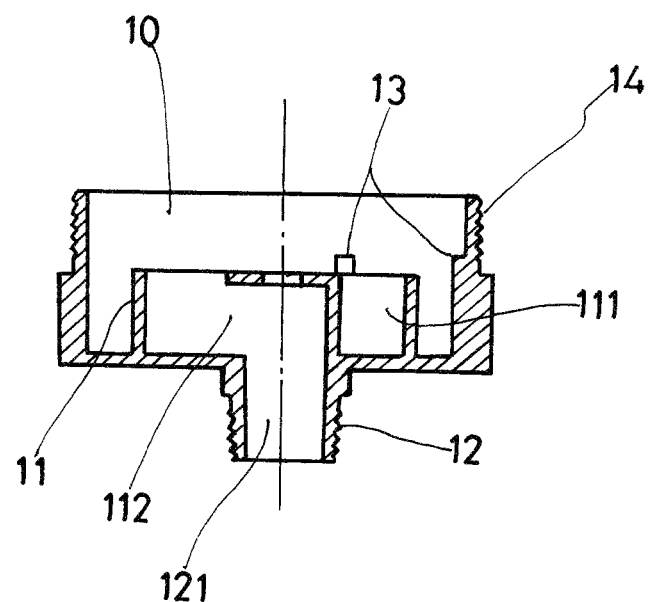
FIG. 4 is a sectional diagram showing a main member of the air filter device of FIG. 1.
Figure 5:
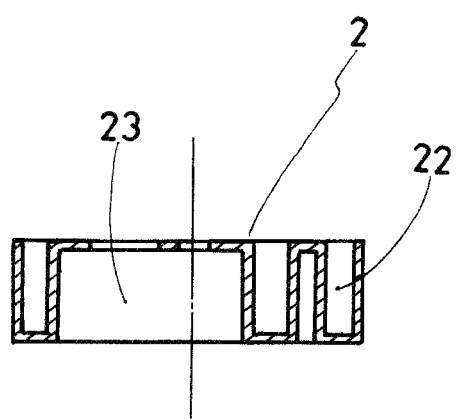
FIG. 5 is a sectional diagram showing a conduit member of the air filter device of FIG. 1.
Figure 6:
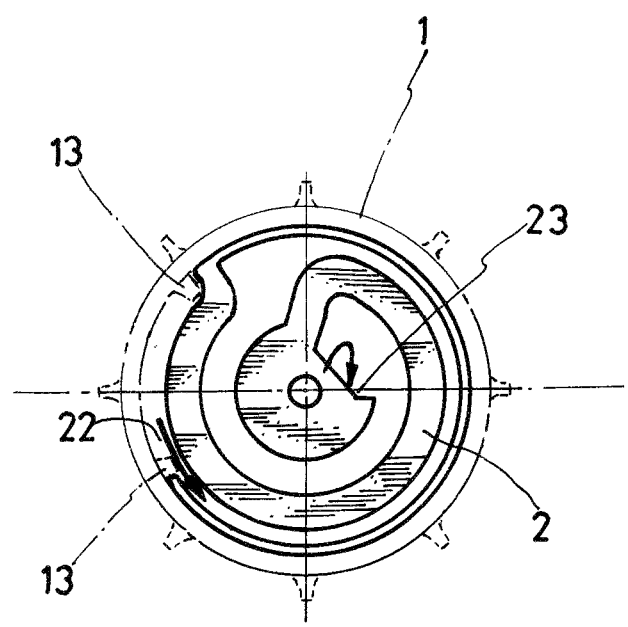
FIG. 6 is a top-view diagram showing the conduit member of FIG. 5.
Figure 7:
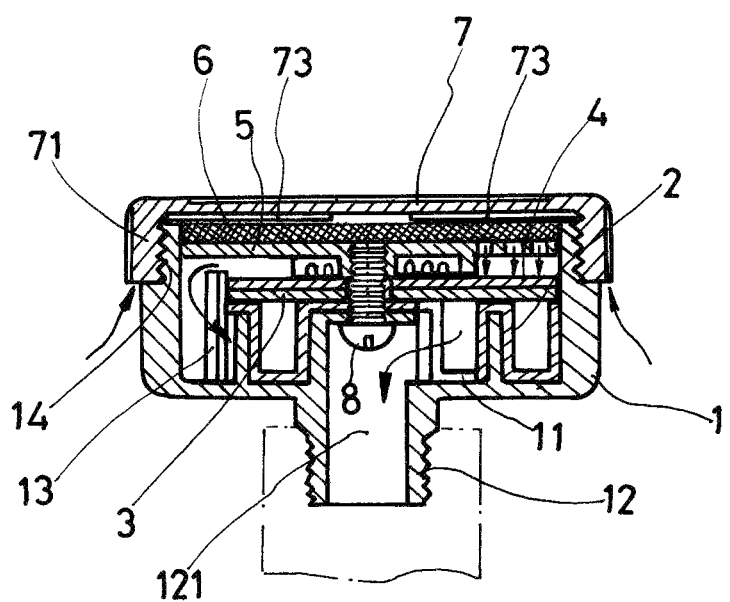
FIG. 7 is a sectional diagram showing the air filter device of FIG. 1.

As shown in FIGS. 1 to 7, an air filter device according to an embodiment of the present invention includes a main member 1, a conduit member 2, a sealing piece 3, a positioning piece 4, a pressurizing piece 5, at least a filter element 6, and a cap 7.

The main member 1 includes a hollow space 10 inside with a top opening. Inside the space 10, a duct 11 with a spiral shape is provided. The duct 11 has a first inlet 111 at the circumference and a first outlet 112 at the center of the spiral shape. A plug 12 is extended from a bottom side of the main member 1. The plug 12 has a vertical through channel 121 inside connecting the first outlet 112. Threads are formed around the plug 12's outer circumference so that the main member 1 may be detachably fastened to an inlet terminal of an air compressor. Two positioning pins 13 are inwardly extended from the circumferential surrounding wall of the space 10. Threads 14 are provided on the circumference around a top portion of the main member 1.

The conduit member 2 is made of a flexible material and has a duct conforming to the shape of the duct 11. The conduit member 2 is placed inside the space 10 and the conduit member 2's duct is embedded in the duct 11. The conduit member 2 has a first indentation 21 along its circumference to receive the two positioning pins 13 of the main member 1. As such, the conduit member 2 is positioned on the duct 11 and will not be displaced. The conduit member 2 also has a second inlet 22 and a second outlet 23. The first and second inlets 111 and 22 are overlapped in a same position, while the first and second outlets 112 and 23 are overlapped in another same position.

The sealing piece 3 is a flexible element and is placed in the space 10 on top of the conduit member 2 so that air does not escape from the conduit member 2's top side. The sealing piece 3 has a second indentation 31 along its circumference to receive the two positioning pins 13 of the main member 1. As such, the sealing piece 3 is positioned in the space 10 and will not be displaced.

The positioning piece 4 is placed in the space 10 on top of the sealing piece 3. The positioning piece 4 has a third indentation 41 along its circumference to receive the two positioning pins 13 of the main member 1. As such, the positioning piece 4 is positioned in the space 10 and will not be displaced.

The pressurizing piece 5 is placed in the space 10 on top of the positioning piece 4 so that the positioning piece 4 is sandwiched between the pressurizing piece 5 and the sealing piece 3. The positioning piece 4 has a number of inlet holes 51 on a top side and an outlet opening 52 along the circumference. The inlet holes 51 and the outlet opening 52 are connected. The outlet opening 52 is also located correspondingly to the first, second, and third indentations 21, 31, and 41, and to the first and second inlets 111 and 22. As such, the outlet opening 52 is connected to the first, second, and third indentations 21, 31, and 41, and to the first and second inlets 111 and 22.

The filter element 6 is placed in the space 10 on top of the pressurizing piece 5 covering the inlet holes 51 so as to provide air filtration for airflow through the inlet holes 51. The filter element 6 is exposed and may be replaced after removing the cap 7.

The cap 7 covers the top opening of the space 10 and has a greater diameter than that of the main member 1. Around an inner wall, at least a pair of oppositely positioned protruding fastening elements 71 is configured where airflow paths 72 are formed between neighboring fastening elements 71. Each fastening element 71 may have threads. The cap 7 is detachably fastened to the main member 1 as the fastening elements 71 engage the threads 14 of the main member 1. When the cap 7 is joined to the main member 1, the airflow paths 72 are connected to the top opening of the main member 1. On an inner top side of the cap 7, a number of radial beams 73 are provided.

To assemble the above components, the conduit member 2 is placed on the duct 11 in the main member 1. Then, the sealing piece 3, the positioning piece 4, the pressurizing piece 5, and the filter element 6 are sequentially stacked on the conduit member 2. Then, through the through channel 121, a bolt element 8 is sequentially run through the main member 1, the conduct member 2, the sealing piece 3, the positioning piece 4, and the pressurizing piece 5. Finally, the cap 7 is fastened to the main member 1 as the fastening elements 71 engage the threads 14 of the main member 1. As the cap 7 is joined to the main member 1, the beams 73 press the filter element 6 down so that the filter element 6 is reliably positioned inside the space 10 and is prevented from rotation and displacement.

To apply the air filter device to an air compressor, the plug 12 of the main member 1 is plugged into the inlet terminal of any air compressor. When the air compressor is started, external air is drawn into the space 10 of the main member 1 through the airflow paths 72 of the cap 7. Impurities such as dusts and particles in the air are then filtered by the filter element 6. The filtered air then flows through the inlet holes 51 and out of the outlet opening 52 of the pressurizing piece 5. Subsequently, the air is guided to the first and second inlets 111 and 22 through the third, second, and first indentations 41, 31, and 21. The air is further guided to the first and second outlets 112 and 23 by the conduit member 2 in a spiral manner. Finally, the filtered air flows into the air compressor through the through channel 121 of the plug 12.

Therefore, the gist of the present invention lies in the following. The main member 1 is configured with a plug 12 for joining with the inlet terminal of any air compressor. The conduit member 2 guides air in a spiral manner so as to provide smooth, steady, and quiet air intake.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An air filter device, comprising:
    a main member comprising a hollow space inside with a top opening, a first duct inside the space with a spiral shape, a first inlet, a first outlet, and a plug extended from a bottom side of the main member, where the plug has a vertical through channel inside connecting the first outlet;
    a conduit member made of a flexible material comprising a second duct conforming to the shape of the first duct with a second inlet and a second outlet, where the conduit member is placed inside the space, the second duct is embedded in the first duct, the first and second inlets are overlapped in a same position, the first and second outlets are overlapped in another same position;
    a sealing piece made of a flexible material placed in the space on top of the conduit member;
    a pressurizing piece placed in the space on top of the sealing piece comprising a plurality of inlet holes on a top side and an outlet opening along the circumference, where the inlet holes and the outlet opening are connected, and the outlet opening is connected to the first and second inlets;

at least one filter element placed in the space on top of the pressurizing piece covering the inlet holes; and a cap covering the top opening of the space with a greater diameter than that of the main member, comprising at least a pair of oppositely positioned protruding fastening elements configured around an inner wall and air flow paths formed between neighboring fastening elements, where, when the cap is detachably fastened to the main member, the air flow paths are connected to the top opening of the main member;

wherein external air flows into the space through the air flow paths of the cap, then sequentially through the filter element, the inlet holes and outlet opening of the pressurizing piece, the first and second inlets, the conduit member, the first and second outlets, and finally out from the through channel of the plug.

2. The air filter device according to claim 1, further comprising a positioning piece disposed between the sealing piece and the pressurizing piece; wherein two positioning pins are inwardly extended from a circumferential surrounding wall of the space; the conduit member has a first indentation along its circumference; the sealing piece has a second indentation along its circumference; and the first and second indentations jointly receive the positioning pins.

3. The air filter device according to claim 1, wherein a plurality of beams are disposed on an inner top side of the cap for pressing the at least one filter element.

4. The air filter device according to claim 1, wherein threads are provided on the circumference around a top portion of the main member; threads are provided on the fastening elements; and the cap is detachably fastened to the main member as the threads of the fastening elements engage the threads of the main member.

* * * * *